D. W. MARTIN.
PUNCTURELESS SPRING TIRE.
APPLICATION FILED JULY 31, 1907.
1,069,452.
Patented Aug. 5, 1913.
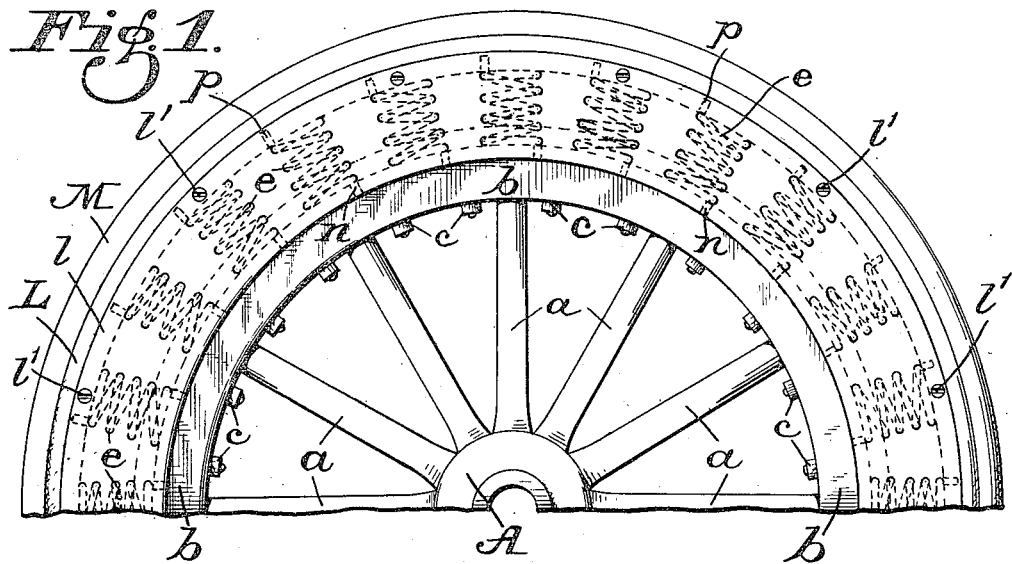
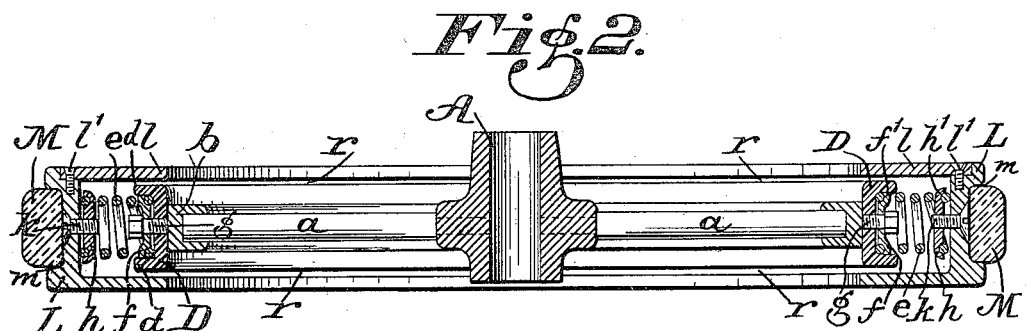
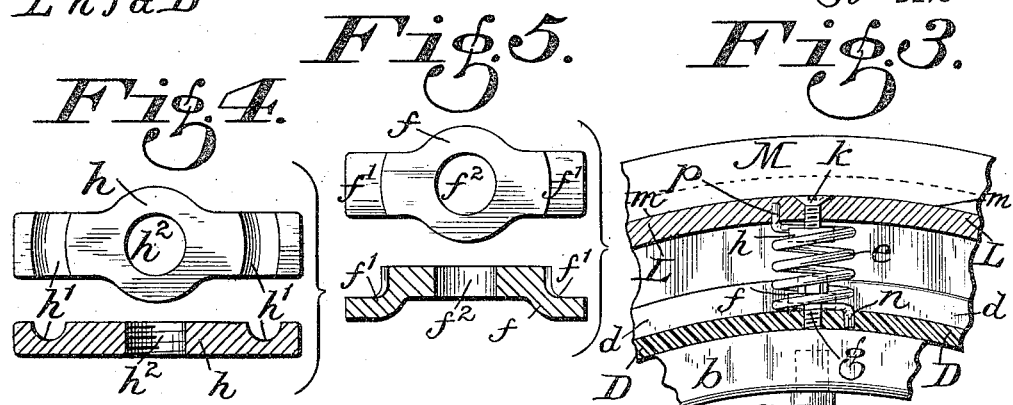
WITNESSES:
Jas. O. Hartshorn.
Rodney W. Martin.
INVENTOR:
Daniel W. Martin,
BY
Frank M. Burnham,
ATTORNEY.
COLUMBIA PLANOGRAPH CO., WASHINGTON, D. C.

UNITED STATES PATENT OFFICE.

DANIEL W. MARTIN, OF WASHINGTON COURT-HOUSE, OHIO.

PUNCTURELESS SPRING-TIRE.

1,069,452. Specification of Letters Patent. Patented Aug. 5, 1913.

Application filed July 31, 1907. Serial No. 386,494.

*To all whom it may concern:*

Be it known that I, DANIEL W. MARTIN, a citizen of the United States, residing at Washington Court-House, in the county of Fayette and State of Ohio, have invented certain new and useful Improvements in Punctureless Spring-Tires; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a punctureless spring tire for wheels, and while said improved tire may be used to great advantage on any class or style of wheels for which said tire is applicable, such for example as wheels for vehicles and bicycles, it is especially and directly intended to be combined in the construction of automobile wheels.

Referring to the accompanying drawing constituting a formal part of this specification, and wherein the same letters of reference are employed to indicate or point out the same parts wherever occurring throughout the several views: Figure 1, is a side elevation of a broken away portion of a wheel, embodying my invention: Fig. 2, is a transverse sectional view of the wheel as shown in Fig. 1; and Fig. 3, is a broken away view partially in section of a portion of the rim of the wheel,—showing the manner of securing the springs. Figs. 4 and 5 are each, plan and vertical longitudinal sectional views—in group,—of the outer and inner clips, respectively.

In describing my said invention specifically and referring in detail to the various mechanical parts or elements of construction, of my improved punctureless spring tire, as shown throughout the several views of the drawing, and indicated by means of the letters of reference as aforesaid; A and $a$ designate respectively, the ordinary form of hub and spokes of a wheel; the outer end of each of said spokes being rigidly seated—in the usual manner—in felly $b$,—to which is secured in any ordinary and well known manner at $c$, an inner metallic rim D,—(which necessarily remains stationary with the felly, spokes and hub)—but of course turns with the wheel. Said rim having vertical flanges $d$ forming a recess or channel in which rests the lower end of each of the helical springs or reacting members $e$;—which are constructed of material of suitable size and strength, and may be arranged close or far apart as desired, around the circumference of the wheel on radial lines, as indicated by dotted lines in Fig. 1. The inner coil of each of said springs being retained in position by the suitably formed ends $f^1$ of each of the inner clips $f$—(see Figs. 2 and 5);—said clips being held in position by means of a bolt-headed screw $g$, the shank of which passes through the smooth or unscrew threaded eye $f^2$ of said clips and engages the screw threaded bore in the inner rim adapted to receive it; while the opposite end of spring $e$ is retained in position by an outer clip $h$—(see Figs. 2 and 4)—provided with end concavities $h^1$ adapted to receive the outer end coil of said springs, and further provided with a screw-threaded bore or eye $h^2$ in which rests the screw-threaded shank or screw $k$,—the head of which rests in a suitable eye adapted to receive it located in the channel of outer hollow rim or annular inclosing casing L to which it is thus connected; one side $l$ of the inner portion of said rim being made removable by means of small screws $l^1$—thus forming an inclosing casing for the springs and clip attachments, by which the same are made readily accessible to, for repairs or any purpose desired, as fully and clearly shown in Fig. 2. If so desired, and for the purpose of more firmly and rigidly holding said springs in position, and for preventing and reinforcing their strength as against any shifting movement—and as more fully seen and shown in Fig. 3, the inner and outer extreme ends or extremities form projections or lugs $n$ and $p$ respectively, extending approximately at right angles to the coils of the spring: inner projection or lug $n$ resting in a suitable depression or cavity adapted to receive it in inner metallic rim D; while outer projection or lug $p$ resting in a like suitable depression or cavity adapted to receive it in outer metallic rim L.

The outer surface or periphery of rim L is recessed so as to form a channel $m$, thus adapting it to receive the elastic punctureless or solid tire M,—preferably formed out of solid rubber or other like suitable and solid material, and constructed in the usual manner. It will be observed that outer hollow rim or annular inclosing casing L is sufficiently wider than inner rim D, thereby leaving an annular space at $r$ (see Fig. 2,)— between the same, thus permitting said outer rim through the medium of helical springs $e$,—see dotted lines in Fig. 1,—to have sufficient play to give and react at any point,— and with it the punctureless elastic tire M,— wherever it may meet any ordinary irregularity or obstruction, thus causing the wheel to pass or ride smoothly over the roughest roads without any fear of a punctured tire or other damage to the wheel.

I am aware of a number of tires in the construction of which springs are employed, but am not aware of any spring tires having my improved features or combinations of improved parts.

Having now fully and clearly illustrated and described my improved punctureless spring tire, what I claim as my invention is:—

1. A resilient wheel comprising in combination with the wheel felly, an inner rim formed with a circumferential groove and vertical flanges and secured to said felly, inner clips secured to said inner rim and formed with lateral flanges to bear against the vertical flanges of said rim, an outer rim or casing grooved circumferentially to receive a tire, outer clips secured to said outer rim or casing and formed with recessed ends, and coil springs secured by said inner and outer clips with their inner convolutions seated between the lateral flanges of the inner clips and the inner rim, and their outer convolutions seated in the recesses of the outer clips and bearing against the outer rim or casing.

2. A resilient wheel comprising in combination with the wheel felly, an inner rim formed with a circumferential groove and vertical flanges and secured to said felly, inner clips secured to said inner rim and formed with lateral flanges to bear against the vertical flanges of said rim, an outer rim or casing grooved circumferentially to receive a tire, outer clips secured to said outer rim or casing, and formed with recessed ends, and coil springs secured by said inner and outer clips with their inner convolutions seated between the lateral flanges of the inner clips and the inner rim, and their outer convolutions seated in the recesses of the outer clips and bearing against the outer rim or casing, said springs having their inner and outer convolutions formed with vertical projections adapted to seat in recesses formed in the inner and outer rims of the wheel respectively.

In testimony whereof, I affix my signature, in presence of two witnesses.

DANIEL W. MARTIN.

Witnesses:
T. J. PERRIN,
RODNEY W. MARTIN.

---

Copies of this patent may be obtained for five cents each, by addressing the "Commissioner of Patents, Washington, D. C."